US011226293B1

(12) United States Patent
Feng

(10) Patent No.: US 11,226,293 B1
(45) Date of Patent: Jan. 18, 2022

(54) STRUCTURED ILLUMINATION OPTICAL INSPECTION PLATFORM FOR TRANSPARENT MATERIALS

(71) Applicant: Seagate Technology LLC, Fremont, CA (US)

(72) Inventor: Kaijun Feng, Fremont, CA (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 16/988,435

(22) Filed: Aug. 7, 2020

(51) Int. Cl.
*G01N 21/88* (2006.01)

(52) U.S. Cl.
CPC . *G01N 21/8806* (2013.01); *G01N 2021/8829* (2013.01)

(58) Field of Classification Search
CPC ................... G01N 21/8806; G01N 2021/8829
USPC ...................................................... 356/237.1
See application file for complete search history.

(56) References Cited

U.S. PATENT DOCUMENTS

| 6,191,850 B1* | 2/2001 | Chiang | G01N 21/88 356/237.1 |
|---|---|---|---|
| 9,350,921 B2 | 5/2016 | Delaney et al. | |
| 2002/0159053 A1* | 10/2002 | Nair | G01N 21/8806 356/237.2 |
| 2014/0362203 A1* | 12/2014 | Delaney | H04N 5/2354 348/79 |

OTHER PUBLICATIONS

Gustafsson, M., "Surpassing the lateral resolution limit by a factor of two using structured illumination microscopy", J. Microscope. 198, pp. 82 (2000).
Strohl, F. et al., "Frontiers in structured illumination microscopy", Optica 3(6), pp. 667 (2016).
Allen, J. R. et al, "Structured Illumination Microscopy for Super-resolution", ChemPhysChem 15, pp. 566 (2014).
Wicker, K., "Super-Resolution Fluorescence Microscopy Using Structured Illumination", Super-Resolution Microscopy Techniques in the Neurosciences, Chapter 7, Humana Press (2014).

* cited by examiner

Primary Examiner — Roy M Punnoose
(74) Attorney, Agent, or Firm — Holzer Patel Drennan

(57) ABSTRACT

A method of imaging surface features with a large (non-microscopic) field-of-view includes projecting a structured illumination pattern onto the transparent target. The surface features modify the structured illumination pattern, and an image of the modified structured illumination pattern is imaged at each of multiple different introduced phase shifts via an imaging device. The method further provides for extracting, from each of the captured phase-shifted images, image components that correspond to frequencies exceeding a cutoff frequency of the imaging device; and using the extracted image components to construct a corrected image of the surface features of the transparent target. The corrected image has a resolution that is greater than a spatially incoherent point-to-point optical resolution of the imaging device.

20 Claims, 8 Drawing Sheets

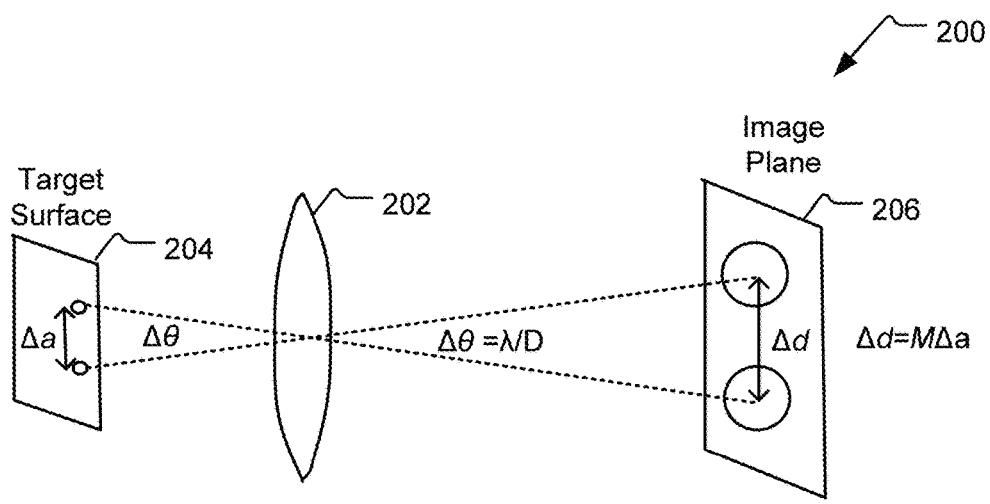
Spatially Incoherent point-to-point resolution = $\Delta d$
Cutoff Frequency: $K_c = (1/\Delta d)$
FIG. 2A
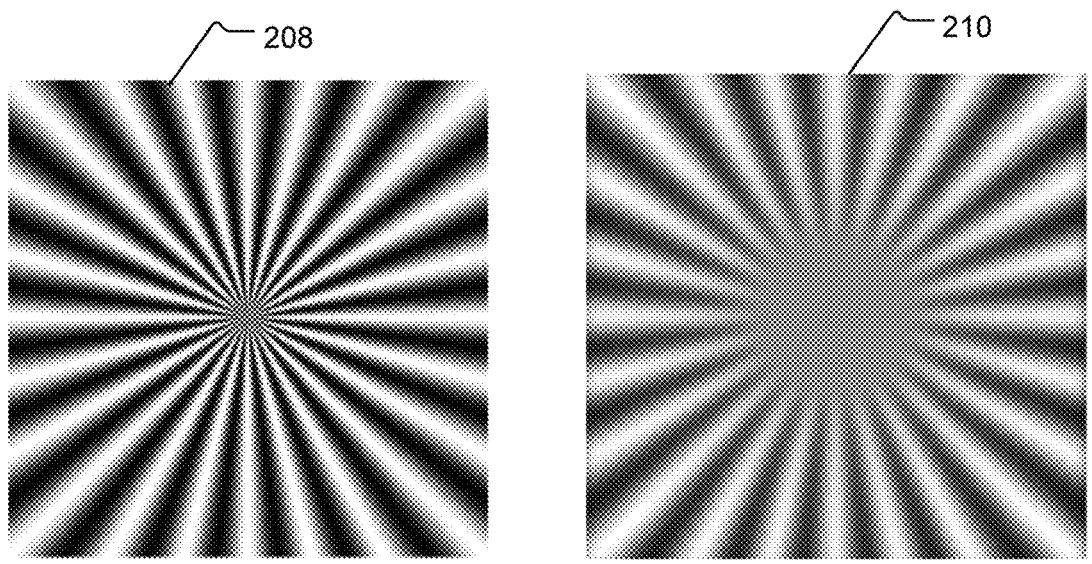
FIG. 2B
FIG. 2C

STRUCTURED ILLUMINATION OPTICAL INSPECTION PLATFORM FOR TRANSPARENT MATERIALS

BACKGROUND

Substrate defect inspection is, in some cases, performed by imaging a substrate surface with a high pixel array camera. However, the resolution of digital images is still limited by the diffraction limit of the camera lens, which may cause higher frequency features to appear blurry.

Common solutions for increasing the resolution of imaging systems include either (1) increasing the lens aperture size; or (2) reducing the field-of-view (FOV). However, increasing the lens aperture size may increase costs, decrease depth of field, and/or be otherwise impractical for certain types optical setups, such as those utilizing telecentric lenses. Additionally, some systems depend on a fixed FOV, such as when an FOV is fixed due to the target size. Currently available optics do not provide cost-effective viable solutions for imaging certain types of targets.

SUMMARY

In one implementation, a surface imaging method provides for projecting a structured illumination pattern onto a transparent target. The transparent target including surface features that modify the structured illumination. The method further provides for capturing an image of the modified structured illumination pattern at each of multiple different introduced phase shifts and extracting, from the collection of phase-shifted images, image components that correspond to frequencies exceeding a cutoff frequency of the imaging device.

A corrected image of the surface features is constructed using the extracted image components, This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIG. 2A illustrates an exemplary optical setup to demonstrate how optical resolution may affect the imaging of features on a target surface.

FIG. 2B illustrates an example surface pattern prior to an imaging step performed by the defect imaging system.

FIG. 2C illustrates an image of the surface pattern of FIG. 2B projected onto an image plane during an imaging step performed by the defect imaging system.

DETAILED DESCRIPTION

The herein disclosed technology provides methods and systems for increasing resolution in substrate defect inspection systems without changing the field-of-view (FoV) or lens aperture size of the imaging device. Although the disclosed technology may be adapted for use in a variety of types of optical systems for various imaging purposes, the herein disclosed examples pertain to large (e.g., non-microscopic) FoV optical systems that image transparent substrates to identify surface features, such as contamination (dust particles), defects (e.g., thermal asperities, small cracks) and other aberrational features. By example and without limitation, this herein disclosed technology may be used to identify and map surface defects on transparent substrates, such as substrates used in the manufacturing of magnetic media (e.g., disks).

The diffraction limit of an optical system defines the minimum angular separation between two points that can be resolved by the system. Features separated by a distance larger than the diffraction limit of an imaging device appear as two separate points in the resulting image while features separated by a distance less than the diffraction limit blur and merge into one. This minimum resolvable angular separation is defined by $(1.22) \lambda/D$, where D is the diameter of the system lens aperture and $\lambda$ is the wavelength of light that is being imaged by the lens. Due to this limit, a camera lens may be understood as having a cutoff frequency (e.g., in cycles per millimeter) that quantifies the smallest object resolvable by an optical system.

Notably, the cutoff frequency is worse near the periphery of the lens than near the center of the lens. The herein disclosed technology leverages this characteristic of optical systems by using structured illumination patterns, imaged at different phase-shifts, to reconstruct characteristics of target surface features that are in a camera field-of-view.

According to one implementation, light is directed onto or through a wavefront modulator to generate a structured illumination. The structured illumination is then directed onto a surface of a transparent substrate and surface features on the transparent substrate modify the received structured illumination, generating what is referred to herein as "amplitude modulated structured illumination." The amplitude modulated structured illumination is imaged by a camera. The wavefront modulator is shifted to multiple different offsets relative to the transparent substrate, and an image of the modified structured illumination pattern is collected at each of the multiple different offsets. High frequency features are extracted from the different images and then recombined using various signal processing techniques to generate a corrected composite image that includes the surface features of the transparent target at a resolution that exceeds the resolution of the lens used to capture the images.

Figure 1:
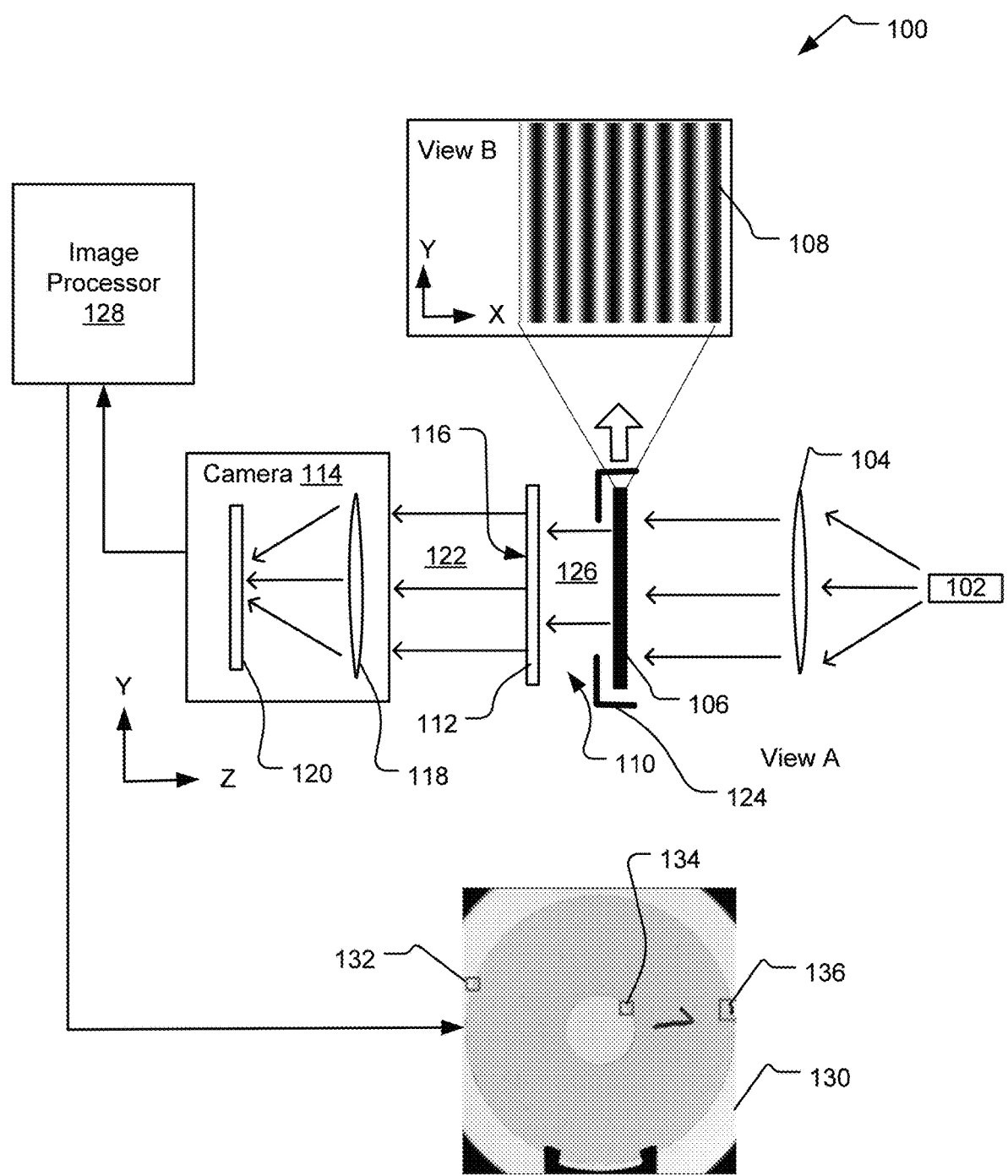
FIG. 1 illustrates a defect inspection system that images surface features on a transparent target.

FIG. 1 illustrates a defect inspection system 100 that images surface features (e.g., defects) on a transparent target 112. The defect inspection system 100 includes a light source 102 that directs light through a first lens 104. The first lens 104 collimates the light and the collimated light is then directed through a wavefront modulator 106. In one implementation, the wavefront modulator 106 is a sinusoidal, amplitude-modulating absorptive mask. The wavefront modulator 106 is shown to be a transmissive modulator that transmits rather than reflecting incident light. In an alternate implementation, the wavefront modulator 106 is a reflective modulator.

The wavefront modulator 106 includes a sinusoidal pattern that consists of lines (e.g., a line 108 shown in View B) separated from one another by predetermined pitch. The pitch of the wavefront modulator pattern determines, at least in part, the final resolution of the defect inspection system 100. In one implementation, the wavefront modulator 106 has a sinusoidal pattern with a pitch equal to a cutoff frequency of a camera 114 used to image the transparent target surface 112 within the defect inspection system 100. In other implementations, the sinusoidal pattern has a pitch greater or less than the cutoff frequency of the camera 114

Alteration of the collimated light by the wavefront modulator 106 beam generates a structured illumination 126 that strikes a first surface 110 of a transparent target 112. When the light passes through the transparent target 112, surface features (e.g., defects, contamination) on the surface of the transparent target 112 further scatter the structured illumination pattern such that the surface features on the transparent target 112 modulate the light to include aspects of the surface feature. This structured illumination that has been modulated by the surface features is referred to throughout the following describing as "an amplitude modulated structured illumination." In some cases, the term "modified structured illumination" is used interchangeably with "amplitude modulated structured illumination."

The amplitude modulated structured illumination 122 includes subpatterns usable to infer information about the location, size, and shape of surface features on the transparent target 112.

This amplitude modulated structured illumination 122 is then directed through a camera lens 118 and onto a sensor 120 of a camera 114 positioned in-line with the light source 102 on an opposite side 116 of the transparent target 112. The lens 104 is, in one implementation, formed integrally with the light source. For example, the light source 102 may be a LED that includes a telecentric lens. In some implementations, the lens 118 within the camera 114 is a conventional lens. In an implementation where the light source 102 includes a telecentric lens, the lens 118 in the camera 114 is also a telecentric lens. A telecentric lens provides better grayscale contrast than a convention lens and also advantageously provides a constant, non-angular field of view and constant magnification that does not depend upon distance between the lens and the object being imaged. These characteristics may reduce both the complexity and length of the image processing operations described herein.

Although a variety of different types of wavefront modulators may be suitable, the wavefront modulator 106 is, in one implementation a grayscale photomask that generates a grayscale structured illumination pattern to provide high contrast resolution of surface features on the transparent target 112. In other implementations, the wavefront modulator 106 is a liquid crystal-based spatial light modulator (SLM).

According to one implementation, the wavefront modulator 106 is positioned on a motorized stage 124. The motorized stage 124 is controlled by system electronics (not shown) to shift the wavefront modulator 106 relative to the transparent target 112 by incremental offsets of select magnitude, each offset introducing a phase shift in the structured illumination 126 that strikes the transparent target 112. At a first offset position of the wavefront modulator 106, the camera 114 captures another image of the amplitude modulated structured illumination 122. This process is repeated for one or more additional offsets such that multiple (e.g., three or more) phase-shifted versions of the amplitude modulated structured illumination are imaged.

In different implementations, the defect inspection system 100 may capture a variable number of phase-shifted images in a given direction and/or images at offsets in multiple directions. In one implementation, the camera 114 captures three images corresponding to three different x-direction offsets of the wavefront modulator 106. In the same or another implementation, the motorized stage 120 moves the wavefront modulator 106 in the y-direction (e.g., into the page) in addition to or in lieu of the x-direction. For example, the imaging process entails capturing images of the amplitude modulated structured illumination 122 at three different x-direction offsets of the wavefront modulator 106 and at three different y-direction offsets of the wavefront modulator 106. In still other implementations, the motorized stage 120 moves the wavefront modulator 106 at one or more offsets that are diagonal into the x/y plane. In an implementation where the mask is moved in two dimensions (along the x-axis and the y-axis), the mask may be rotated 90 degrees for movements along one of the two axes.

The captured images are provided to an image processor 128 that performs various operations to effect a reconstruction of high frequency features in the amplitude modulated structured illumination 122 that are otherwise beyond the cutoff frequency of the lens 118. The image processor 128 outputs a surface map 130 that includes defects (e.g., defects 132, 134, 136) that have been imaged from the surface of the transparent target 112. As explained with respect to the following figures, the surface map 130 is of a resolution that exceeds the resolution of the camera 114. The image processor 128 may comprise software, hardware, or a combination of hardware and software. In some implementations, the image processor 128 includes computer-executable instructions stored in memory. For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, operating systems, applications, and the like that are accessed by a computer processor to perform the desired functionality. The term "memory" is defined herein to expressly exclude intangible computer-readable communication signals that embody computer readable instructions, data structures, program modules or other data resident in a modulated data signal, such as a carrier wave or other signal transport mechanism FIG. 2A illustrates an exemplary optical setup 200 to demonstrate how optical resolution may affect the imaging of features on a target surface. The optical system 200 includes a lens 202 with a diffraction limit providing for a minimum angular resolution $\Delta\theta = 1.22\lambda/D$, where D is the diameter of the lens aperture 202 and $\lambda$ is the wavelength of light. This expression may be approximated as $\lambda/D$. In the illustrated example, this minimum angular separation corresponds to a distance $\Delta a$ between two points on a surface of the target 204 and that are magnified by a magnification (M) when projected onto an image plane 206 at a resulting separation $\Delta d$, which may be understood herein as referring to the spatially incoherent point-to-point resolution of a lens. At separations smaller than the spatially incoherent point-to-point resolution, two separate objects appear to merge into one. The cutoff frequency of the lens is herein defined as the inverse of the spatially incoherent point-to-point resolution ($1/\Delta d$). The higher frequency of light passing through the lens 202, the larger the spatially incoherent point-to-point resolution.

FIG. 2B illustrates an example surface pattern 208 that may exist on the target 204. The surface pattern 208 is used throughout the example of FIGS. 2 and 3 to illustrate the effect of the cutoff frequency of the lens 202 on surface features of different frequency. However, the features of the surface pattern 208 are not intended to resemble the types of surface features on a target that may be subject to imaging in an actual use of a defect inspection system implementing the disclosed technology. In the example surface pattern 208, high frequency features exist toward the center while lower frequency features fan out to the periphery. In actual implementations of the technology, the surface pattern 208 may consist of a collection of unknown surface defects (e.g., scratches, dust particles, abnormalities).

FIG. 2C illustrates an image 210 of the surface pattern 208 of target surface 204 projected onto the image plane 206 by the optical system. Ignoring the magnification factor, the image 210 can be expressed as:

$$f(r) = s(r) * h(r) \qquad (1)$$

where the target surface 204 is given by $s(r)$ and $h(r)$ represents the intensity point-spread-function (PSF) of the imaging device. Due to the diffraction limit, the lens 202 acts as a low-pass filter such that higher frequency components are blurred and lower frequency components remain. The imaging system is not capable of resolving structures with a line spacing less than the spatially incoherent point-to-point resolution.

Figure 2D:
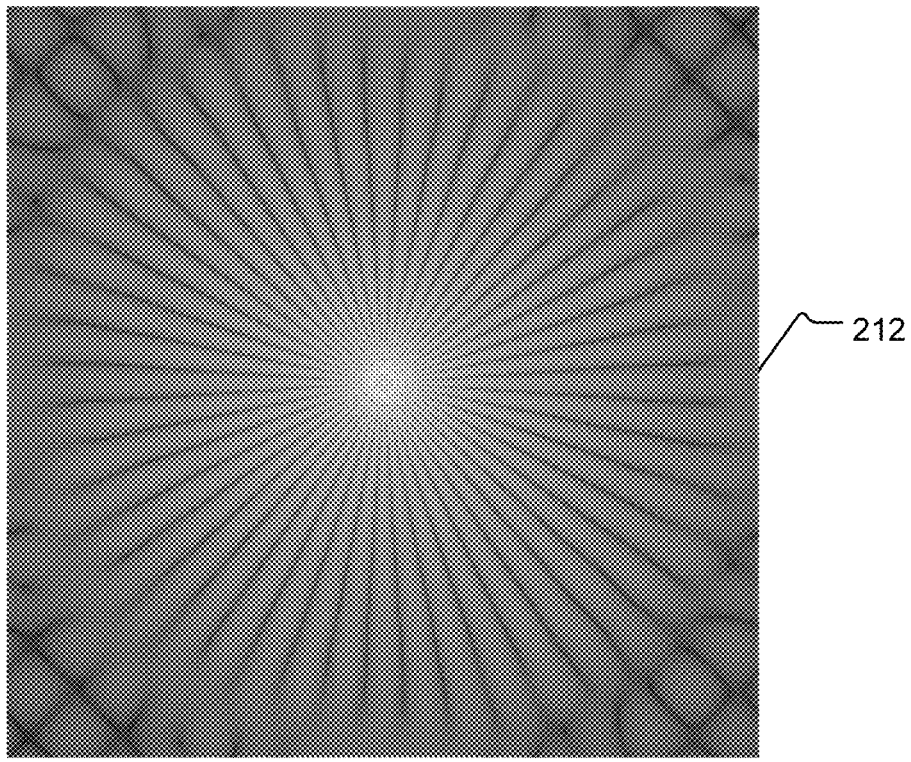
FIG. 2D represents a fast Fourier transform (FFT) of the surface pattern of FIG. 2B.

FIG. 2D represents a frequency domain equivalent 212 (fast Fourier transform (FFT)) of the surface pattern 208 shown in FIG. 2B. In the frequency domain, equation (1) above becomes:

$$F(k) = S(k)H(k) \qquad (2)$$

where $S(k)$ is the 2D FFT of $s(r)$, $F(k)$ is the FFT of the image 210 and $H(k)$ is the optical transfer function (OTF) of the imaging device.

Figure 2E:
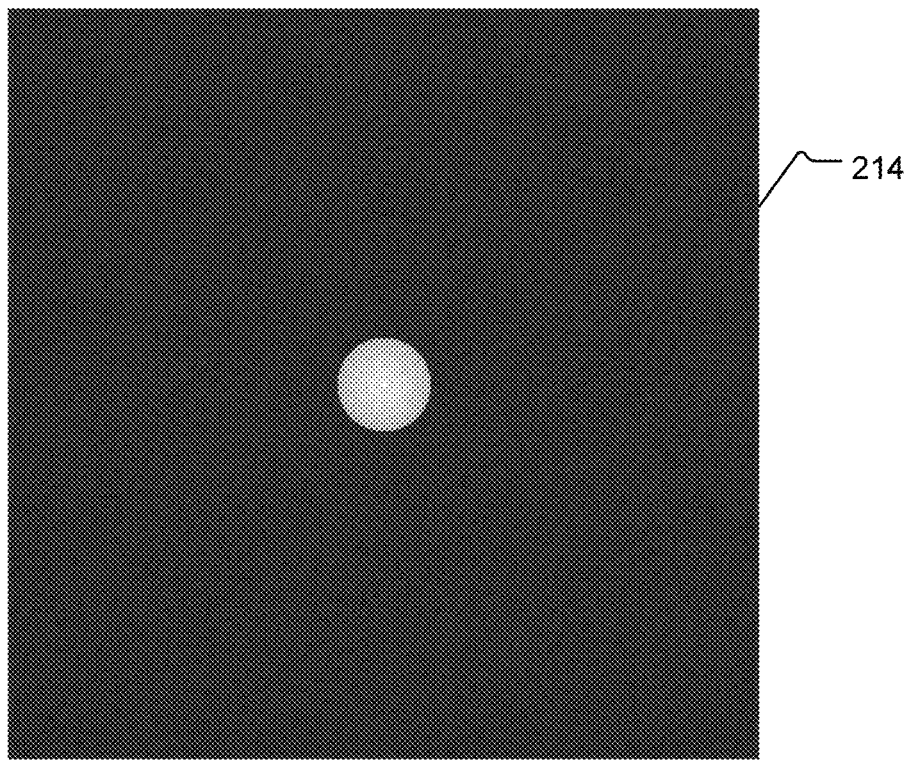
FIG. 2E illustrates an FFT of the image of FIG. 2C.

FIG. 2E illustrates a frequency domain equivalent (FFT) 214 of the image 210. Since it is known that the OTF of a perfect incoherent imaging device has a circular shape with monotonically decreasing magnitude form low to high frequency, $F(k)$ is expected to be zero beyond the cut-off frequency of the imaging device.

According to one implementation, a defect imaging system utilizes projected structured illumination, FFTs, and image processing techniques to improve the resolution of the image 210 captured by the optical system 200 without changing characteristics of the lens 202 or optical system field-of-view. Consequently, features above the cutoff frequency of the lens 202 are resolved in a final corrected image of the surface pattern 208. In some implementations, the herein disclosed techniques effectively double the resolution of the imaging system.

Figure 3:
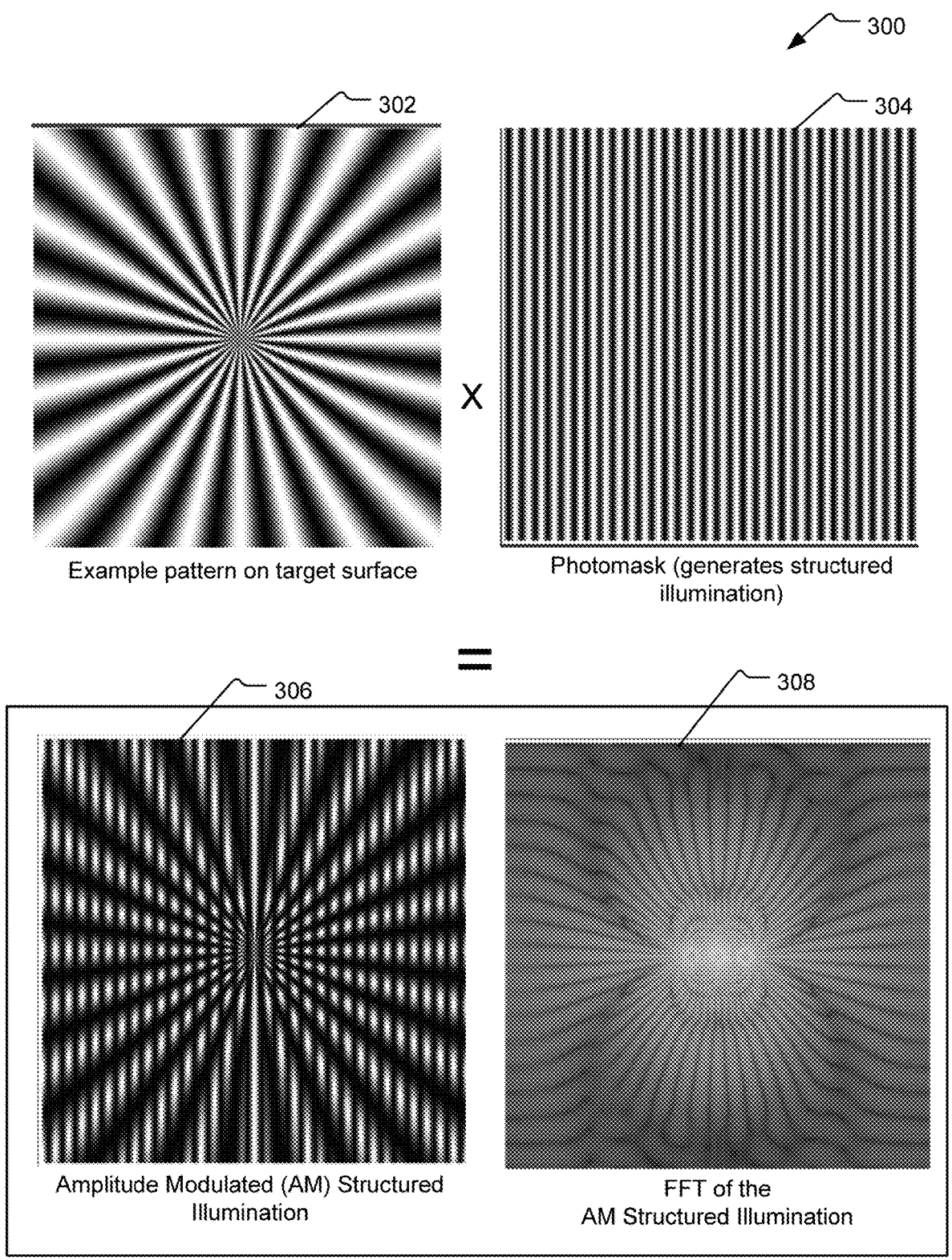
FIG. 3 illustrates example aspects of a particular methodology usable to improve resolution of an imaging system beyond the spatially incoherent point-to-point resolution of the optical components within the system.

FIG. 3 illustrates example aspects of a particular methodology usable to improve resolution of an imaging system beyond the spatially incoherent point-to-point resolution of the optical components within the system. Per this methodology, surface features (e.g., defects, scratches, particles) are imaged on a transparent target surface. To help simplify optical concepts of this methodology, it is assumed in the example of FIG. 3 that the surface features are in the form of a surface pattern 302/

A wavefront modulator 304 is placed in the path of light in front of the transparent target surface. In one implementation, the wavefront modulator 304 is a grayscale photomask. When light passes through the wavefront modulator 304, the result is a projected structured illumination with a sinusoidal pattern. When this projected structured illumination passes through the transparent target with the surface pattern 302, the result is an amplitude modulated structured illumination 306. According to one implementation, the wavefront modulator 304 has a pattern pitch equal to the cutoff frequency of the camera used to image the target surface.

In the amplitude modulated structured illumination 306, the surface pattern 302 and the sinusoidal pattern of the wavefront modulator 304 are superposed multiplicatively. If $p(r)$ is used to represent the structured light pattern (e.g., a pure sinusoidal pattern) generated by the wavefront modulator 304, equation (1) above becomes:

$$f(r) = [s(r)p(r)] * h(r) \qquad (3)$$

where $p(r)$ is equal to $1 + \cos(k_c x)$, where $k_c$ is the cutoff frequency of the imaging device. According to one implementation, the frequency of the sinusoidal pattern of the wavefront modulator 304 is selected to match the cutoff frequency of the lens in the imaging device. This cutoff frequency represents an amount by which the high frequency features in the amplitude modulated structured illumination 306 are shifted in the Fourier domain.

Specifically, a Fast Fourier transform (FFT) domain equivalent 308 of the amplitude modulated structured illumination 306 includes three copies of the original scene (e.g., the high-frequency features in the surface pattern 302) FFT shifted relative to one another. For example, the positive high frequency information in the center shifts by a set distance in one direction (e.g., left) while the negative high frequency information shifts by the set distance in the opposite direction (e.g., right) and the original low frequency domain pattern is also retained in its original position.

The significance of the sinusoidal modulation is best derived in the frequency domain. In the frequency domain, equation (3) above becomes:

However, in the frequency domain, the sinusoidal pattern $P(k)$ can be expressed as:

$$F(k) = [S(k) * P(k)]H(k) \qquad (4)$$

$$P(k) = \delta(k) + \frac{1}{2}\delta(k - k_c) + \frac{1}{2}\delta(k + k_c) \qquad (5)$$

where $k_c$ is the frequency of the sinusoidal pattern and the cut-off frequency of the lens in the imaging system. Substituting equation (5) into equation (4) yields:

$$F(k) = \left[ S(k) + \frac{1}{2} S(k - k_c) + \frac{1}{2} S(k + k_c) \right] H(k) \qquad (6)$$

From equation 6 above, it is clear that the amplitude modulated structured illumination 306 includes the surface pattern 302 shifted in the frequency domain in both the positive and negative directions by an amount equal to $k_c$ (the cutoff frequency of the lens). Thus, the FFT domain equivalent 308 of the amplitude modulated structured illumination 306 is a sum of three contributions (e.g., unshifted, shifted positive, shifted negative), and it is not possible to separate them using a single image. By recoding three or more such images of the amplitude modulated structured illumination 306 corresponding to different phase shifts, the three different shifted components can be separated by signal processing FFTs of the images, allowing a reconstruction of information corresponding to the high-frequency features. This recombination technique is also described in detail in K. Wicker, "Super-Resolution Fluorescence Microscopy Using Structured Illumination", Super-Resolution Microscopy Techniques in Neurosciences, Chapter 7 (Humana Press (2014)), hereinafter "Wicker 2014," which is hereby incorporated by reference for all that it discloses or teaches.

Certain aspects of the above-described technique (e.g., using multiple phase-shifted samples of amplitude modulated surface to expand a field of view) has been used in the field of structured illumination microscopy (SIM) to expand the observable frequency region within the field-of-view of a microscope. However, SIM utilizes multiple lasers to create a known interference pattern on an image plane of an observed sample. These interference patterns allow for extraction sample details on the nanometer level (e.g., resolution of ~200 nm), which is smaller than the wavelengths corresponding to the visible spectrum of light. In this approach the typical sinusoidal pattern period of the structured illumination around 250 nm and the typical field-of-view (FOV) of the imaging field is on the order of ~1 mm.

In contrast, the presently-disclosed technology contemplates substrate defect inspection on a considerably larger scale, such as in tens of microns—much larger than range of wavelengths in light in the visible spectrum. For example, the herein disclosed defect inspection system may be used to image a ~10 cm target. Although the existing SIM imaging approaches could, in theory, be used to image a 10 cm target, doing so would require stitching together about 10000 images with the ~1 mm FOV in the SIM system. If it takes approximately 1 minute to take a 1 mm FOV image, capturing enough images to cover a 10 cm target (e.g., approximately 10000 images) may take on the order of 3 hours, not accounting for the time involved in moving the sample around under the microscope and the processing time needed to stitch together the 10000 images. For this reason, it is not feasible to use the above-described SIM approach (e.g., using interference patterns of lasers) to image certain larger targets.

To overcome the foregoing limitation while still allowing for a mathematical reconstruction of surface features from multiple images that is similar to the SIM approach, the herein proposed technique proposes projecting structured illumination patterns through a transparent target (as generally described above), thereby allowing surface features of the target to amplitude modulate the structure illumination.

According to one implementation, a phase shift of the projected structured illumination is achieved by shifting the wavefront modulator 304 to different positions while the light source and transparent target remain fixed. At each shifted position of the wavefront modulator 304, an image of the target is collected as described above such that the FFT equivalent of each individual image includes the three copies of the high-frequency information (e.g., details corresponding to surface features separated by distances less than the spatially incoherent point-to-point resolution of the camera lens). FFT versions of the different images of the target are then analyzed to extract high frequency information present within the surface pattern 302 on the transparent substrate. This extracted information may then be used to reconstruct the features beyond the cutoff frequency of the optical system.

Figure 4:
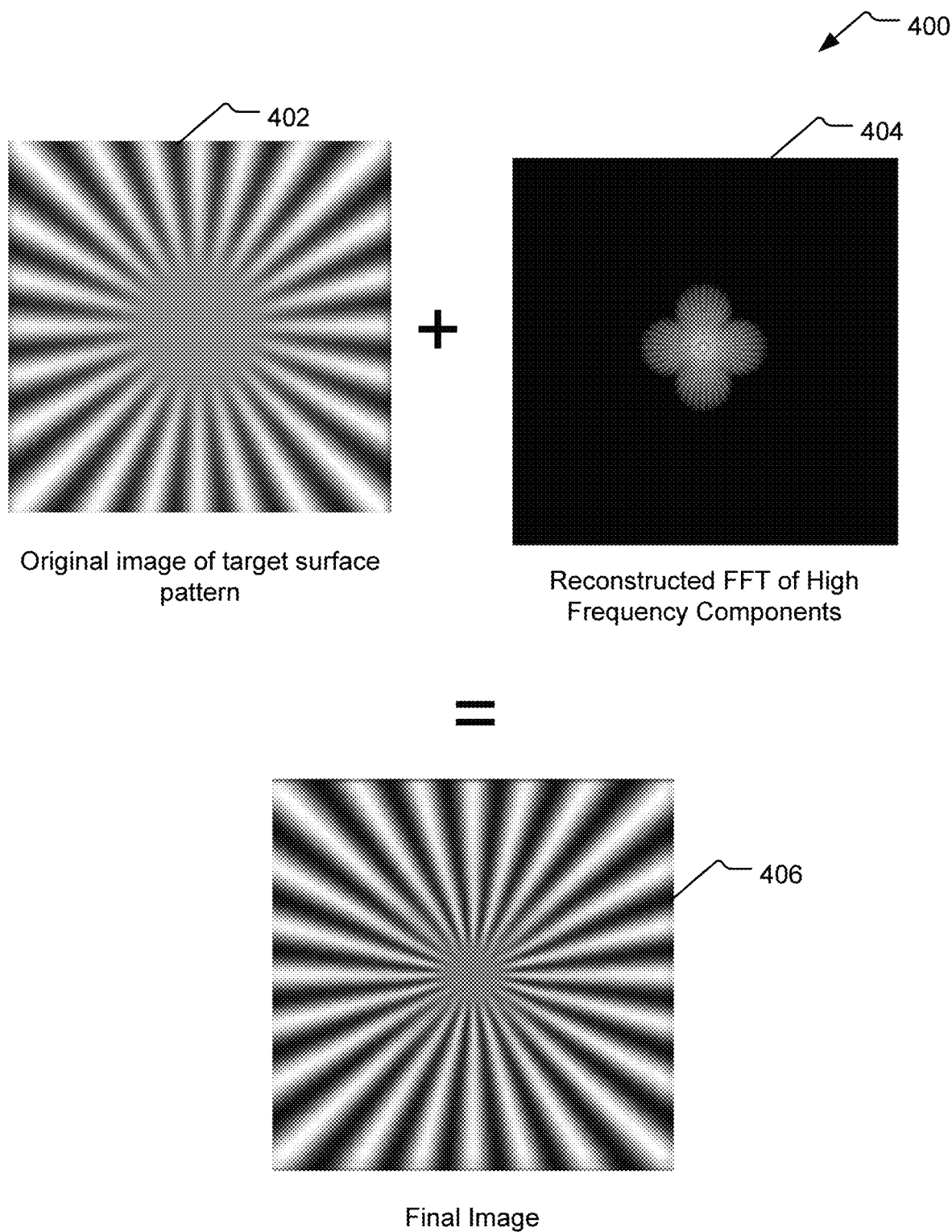
FIG. 4 illustrates an example improvement in resolution attained by a defect inspection system that uses phase-shifted images of amplitude-modulated (AM) structured illumination to improve image resolution.

FIG. 4 illustrates an example improvement in resolution attained by a defect inspection system 400 that uses phase-shifted images of an amplitude-modulated structured illumination to improve resolution of image features.

An original image 402 represents a pattern on a surface of a transparent target that has been imaged by a camera. Due to the diffraction limit of the lens within the camera, high-frequency components of the pattern are blurred. A reconstructed image 404 of the high-frequency components is generated by applying the techniques described above with respect to FIG. 3. For instance, the reconstructed image 404 is created by (1) projecting a structured illumination through the transparent target; (2) imaging the resulting amplitude modulated (AM) structured illumination at multiple different select phase shifts of the structured illumination; and (3) performing signal processing that entails extracting the high frequency components from the different images, shifting the extracted components to correction locations in the Fourier domain and recombining the shifted extracted components in the frequency domain.

In one implementation, the multiple phase shifts are introduced by moving a wavefront modulator in along an x-direction axis. The magnitude of the offset is selected such that the sinusoidal illumination pattern is physically shifted along the x-axis by an amount corresponding to a 2π/3 phase change at each different position of the wavefront modulator. An image is captured at each position. The new shifted sinusoidal patterns can be expressed in frequency domain as:

$$P(k)_{\pm\alpha} = \delta(k) + \frac{1}{2}\delta(k - k_c)e^{\pm i\alpha} + \frac{1}{2}\delta(k + k_c e^{\mp i\alpha}) \qquad (7)$$

where the phase shift α=(2π/3).

Mathematically, the extraction of the high frequency components from the images entails untangling the three versions of the high frequency components that are present in each phase-shifted image of the amplitude modulated structure illumination. As explained above, each amplitude modulated structured illumination image includes one conventional low-frequency image overlaid with two frequency-shifted copies. By example and without limitation, it may be assumed that three images of the amplitude modulated structured illumination are captured at phase shifts of 0, +2π/3, and −2π/3. Here, FFT equivalents of the three images may be denoted as $F_0(k)$, $F_{2\pi/3}(k)$ and $F_{-2\pi/3}(k)$. Substituting equations 4 and 6 into equation 3 yields the following matrix equation:

$$F(k)=MS(k)H(k) \qquad (8)$$

with quantities defined as follows:

$$F(k) = \left[F_0(k), F_{\frac{2\pi}{3}}(k), F_{-\frac{2\pi}{3}}(k)\right]^T,$$

$$S(k) = \left[S(k), \frac{1}{2}S(k-k_c), \frac{1}{2}S(k+k_c)\right]^T,$$

$$M = \begin{bmatrix} 1 & 1 & 1 \\ 1 & e^{i\alpha} & e^{-i\alpha} \\ 1 & e^{-i\alpha} & e^{i\alpha} \end{bmatrix}$$

From equation (8), it is known that the vector S(k)H(k) contains the low passed version of the surface features with the different frequency shift amounts. This vector can be solved as:

$$S(k)H(k)=M^{-1}F(k) \qquad (9)$$

In the case of $\alpha=(2\pi/3)$, $M^{-1}$ is given by:

$$M^{-1} = \frac{1}{3}\begin{bmatrix} 1 & 1 & 1 \\ 1 & e^{-i\alpha} & e^{i\alpha} \\ 1 & e^{i\alpha} & e^{-i\alpha} \end{bmatrix}$$

Using this methodology, the three components corresponding to frequency shifts of 0, $-k_c$, $k_c$ can be individually calculated and therefore untangled from one another. This concept can similarly be extended to untangle the high frequency components in sets of images larger than three and/or using phase shift amounts that are different than in the above example. For example, the reconstructed FFT image 404 is generated based on three images taken at offsets in the x-direction and three images taken at offsets in the y-direction (notably, a single image may be taken in the center position and thus the reconstructed FFT image 404 may be based on 5 total images rather than six).

After the three frequency shift components in each image (e.g., within S(k)H(k)) have been untangled as described above, the next step is to shift the high frequency components back to correct (unshifted) locations in Fourier space, such that the components can then be combined to reconstruct the original image 402 with doubled frequency support. This reconstructed FFT image 404 is then converted back to the primal/spatial domain and used to construct a final image 406 of the target surface features. This final image 406 illustrates an example improvement in resolution achieved as compared to the original image 402.

One challenge in shifting of the untangled high-frequency components (as described above) arises from the fact that the magnitude of the shift ($k_c$) is rarely an integer number of pixels. Existing methods for shifting the different components to align in the final image tend to introduce artifacts and errors due to rounding or other techniques aimed to address this problem. These challenges may be overcome by using a 2D Fourier interpolation shifting scheme to perform an arbitrary frequency shifting. For example, assume the pixel grid of each FFT images is $\{(i,j)\}$ where $i,j \in \mathbb{Z}$ and the pattern is to be shifted by an arbitrary vector $(k_0, k_1)$ where $k_0, k_1 \in \mathbb{R}$. In this case, a query grid is constructed of the form $\{(i,j)-(k_0, k_1)\}$ and pixels on this query grid are populated by interpolating the original FFT image using methods such as bilinear or bicubic interpolations. Since the images of interest all have zero values at high frequencies (e.g., as in FIG. 2E), it is safe to simply extrapolate any undefined region with zeros. As a result of the shifting procedure, we obtain the desired signal components:

$$\Omega(k+mk_c)=S(k)H(k+mk_c) \qquad (9)$$

Different methods can be used to reconstruct the high resolution image from these properly shifted components such as those described in Wicker 2014, referenced above. In one implementation, a component level Wiener denoise filer is used to suppress noise present in real-life measurement. Additionally, an apodization function can be employed to modify the shape of the effective OTF to be more natural.

Figure 5:
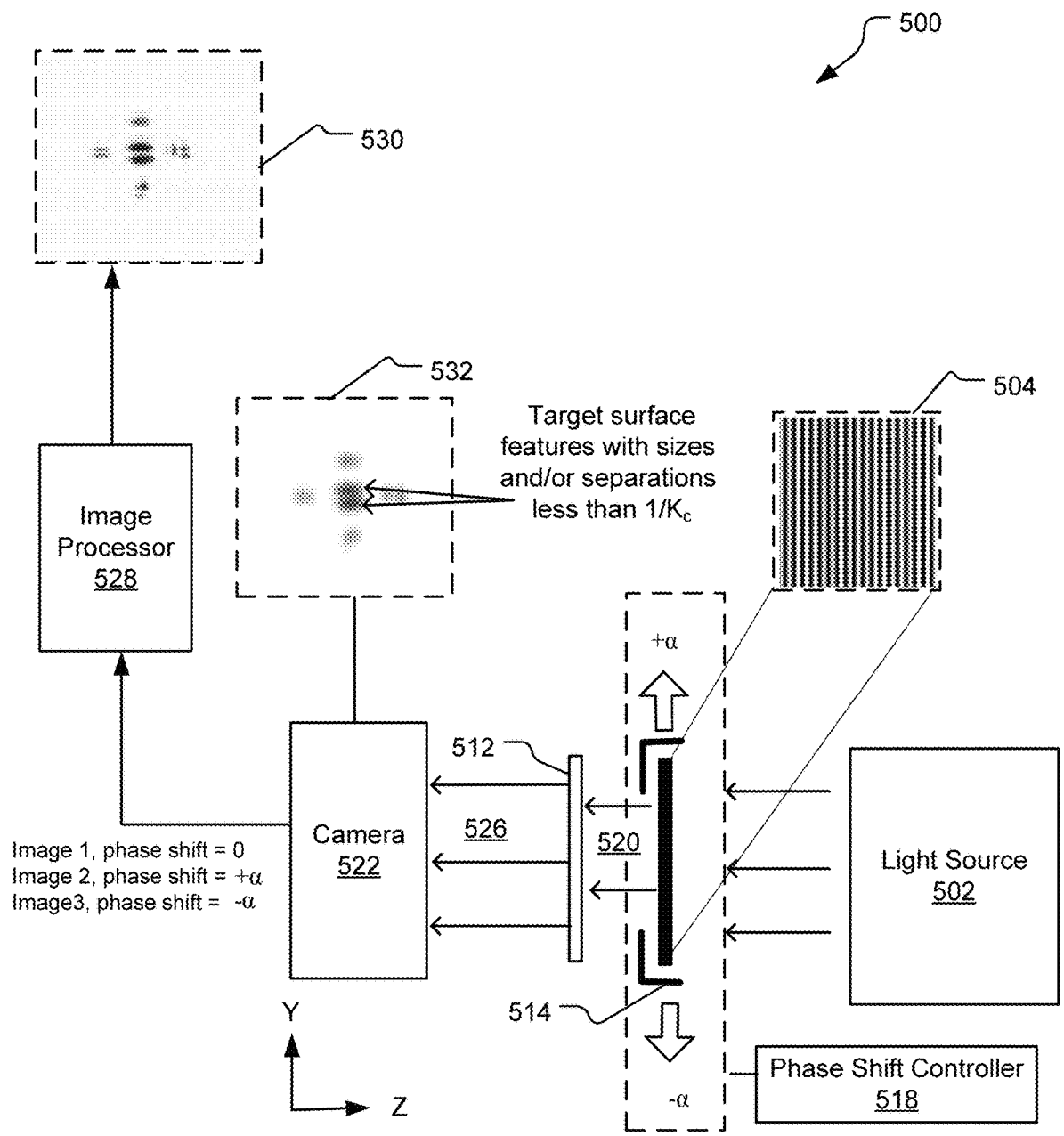
FIG. 5 illustrates an example defect imaging system that uses images of phase-shifted, amplitude-modulated structured illumination to improve resolution of imaged high frequency features.

FIG. 5 illustrates an example defect imaging system 500 that uses a camera to image an amplitude-modulated (AM) structured illumination 526 at different phase shifts to reconstruct details on a target surface that are beyond the cutoff frequency of the camera. The defect imaging system 500 includes a light source 502 position to direct a beam of light through a grayscale photomask 504 (e.g., one example suitable wavefront modulator). The grayscale photomask 504 generates a structured illumination 520 that is then directed through a transparent target 512. Surface features on the transparent target 512 modulate the projected structured illumination, yielding an amplitude modulated structured illumination 526 that is then imaged by a camera 522.

The camera 522 has a spatially incoherent point-to-point resolution Δd and a cutoff frequency $K_c=(1/\Delta d)$, where such values are defined as explained in reference to FIG. 2. An example image 532 illustrates a pattern of defects on the surface of the transparent target 512 where the individual features exceed the cutoff frequency of the camera 522 and are therefore blurry. According to one implementation, a phase shift is selectively introduced into the structured illumination by moving the grayscale photomask 504 relative to the transparent target 512 by an x-direction distance sufficient to introduce a predefined phase shift α into the structured illumination 520.

According to one implementation, the grayscale photomask 504 is positioned on a motorized stage 514 that is controlled by a phase shift controller 518. The phase shift controller 518 controllably shifts the motorized stage 514 and the grayscale photomask 504 by a shift of predefined magnitude (e.g., to cause the sinusoidal pattern to shift by the amount α).

At each different position of the grayscale photomask 504, the camera 522 captures a phase-shifted image of an amplitude modulated structured illumination 526. Although different implementations may provide for imaging at different numbers of these shifts in either 1D or 2D, FIG. 5 illustrates a scenario where three different images are captured at different x/y shifts of the grayscale photomask 504. For example, a first image of the amplitude modulated structured illumination 526 is captured at with the grayscale photomask 504 at its original (unshifted) position; a second image is captured at a shift positioned shift corresponding to a phase shift of +α and a third image is captured at a position corresponding to the phase shift of −α.

An image processor 528 converts the images to the frequency domain (e.g., by performing Fast Fourier Transformations of each image) and identifies features in each image that exceed the cutoff frequency of the camera 522. The image processor extracts these features (collectively referred to herein as the "high frequency features") and within each of the FFT images, shifts a position of each one of the extracted high-frequency features by a magnitude and position sufficient to cancel out the corresponding frequency shifts due to the structured illumination. The shifted high-frequency features are then combined, yielding a single reconstruction of the high frequency features. The image processor 528 combines (e.g., overlays) this reconstructed image of the high frequency feature with the image that was captured by the system original (unshifted) position of the grayscale photomask. A final image 530 including the reconstructed high frequency features is output by the system.

In improvement in resolution attained by the system is proportional to the pitch of the sinusoidal pattern of the grayscale photomask 504. For maximum improvement in resolution, the pitch of the sinusoidal pattern may be selected to equal the cutoff frequency $K_c$.

Figure 6:
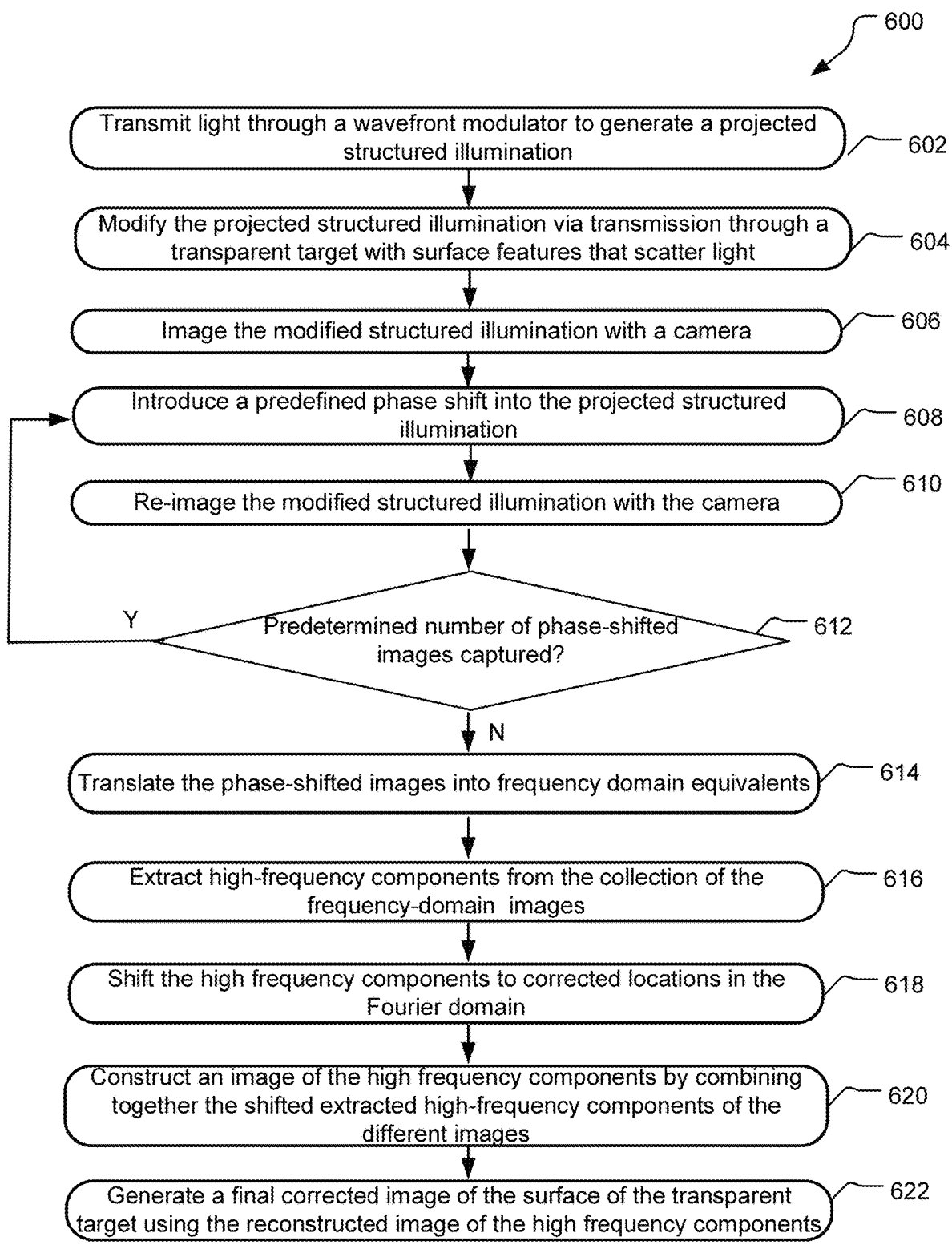
FIG. 6 illustrates example operations for utilizing phase-shifted images of structured illumination that has been amplitude modulated by surface features to improve resolution of an image of the surface features.

FIG. 6 illustrates example operations 600 for utilizing phase-shifted images of structured illumination that has been amplitude modulated by surface features to improve resolution of an image of the surface features. A light transmission operation 602 directs a light beam through a wavefront modulator to generate a structured illumination. In one implementation, the wavefront modulator is a grayscale photomask. A pattern modification operation 604 modifies the projected structured illumination by further directing the light through a transparent target. For example, the transparent target includes a surface feature pattern that further scatters the light and alters the projected illumination pattern so as to amplitude modulate the structured illumination with the surface feature pattern.

An imaging operation 606 images the modified structured illumination with a camera. A phase shifting operation 608 introduces a select phase shift into the projected structured illumination by shifting the wavefront modulator by a predetermined offset relative to an original position. A reimaging operation 610 reimages the modified structured illumination that is generated as a result of the phase shifting operation 608.

A determination operation 612 determines whether images of the modified structured illumination have been captured at each of a number of predefined offsets. If not, the phase shifting operation 608 and the reimaging operation 610 repeat successively until an image has been captured of the modified structured illumination at each offset of the wavefront modulator. Once the determination operation 612 determines that the images have been captured at each of the predefined offsets, a domain translation operation 614 performs a Fast Fourier Transform on each of the phase-shifted images to translate the image into a frequency domain equivalent.

A feature extraction operation 616 extracts high frequency components from each of the frequency-domain equivalents of the imaged modified structured illumination. The high frequency components extracted are, for example, components that have sizes or separations too small to be resolved by the imaging device. A frequency shifting operation 618 shifts the high-frequency components in each separate image to correction locations in the Fourier domain (e.g., such that like-features in different images are shifted to like-locations).

A construction operation 620 constructs a single image of the high frequency components by combining the shifted high-frequency components into a single image and converting the image from the frequency domain back to the spatial domain (e.g., reversing the FFT).

A final image generation operation 622 generates a final corrected image of the target surface features by performing various image processing operations that entail, for example, combining the reconstructed image of the high frequency components with an original image captured by the camera (e.g., overlaying the reconstructed image of the high frequency components with an image including the lower frequency components. The final image has a resolution that is, in some implementations, as high as twice the resolution of the camera lens.

Figure 7:
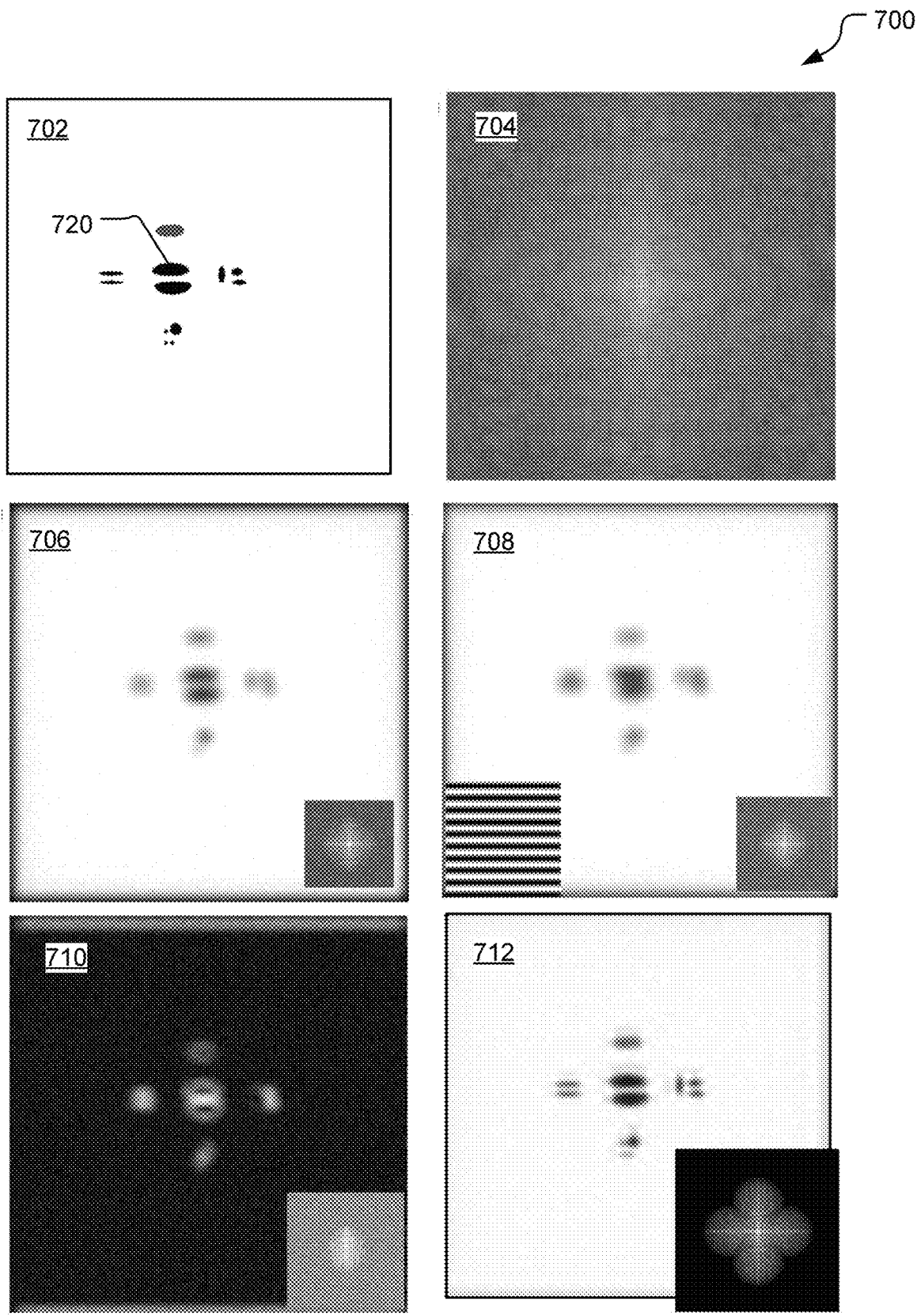
FIG. 7 illustrates exemplary aspects of a defect inspection system that uses phase-shifted images of an amplitude-modulated structured illumination to improve image resolution.

FIG. 7 illustrates exemplary aspects of a defect inspection system 700 that utilizes amplitude modulated structured illumination to improve image resolution. The system 700 includes a target surface with a region 702 including defects (e.g., a defect 720) that are to be imaged. In one implementation, the region 702 corresponds to a 1.5×1.5 mm region on a target surface, where the full target surface spans approximately 10 cm in diameter. In one implementation of the disclosed technology, the entire target surface is imaged at once (e.g., the camera has an FOV at or larger than about 10 cm). The features in the region 702 are beyond the cutoff frequency of the camera lens and are therefore reconstructed according to the herein disclosed techniques.

An FFT image 704 represents a frequency domain (FFT) equivalent of the region 702 without resolution loss due to the diffraction limit of the imaging system. An image 706 of the region 702 is captured by a camera with an F/16 lens. An image 708 of the region is captured by the camera while the region 702 is illuminated with the structured illumination. An image 710 depicts a signal processing step wherein high frequency content has been extracted, untangled, and shifted. A reconstruction image 712 illustrates a final reconstructed image of the region 702. The reconstructed image 712 has a resolution approximately twice that of the original image 706. All insets on the lower right corner of each image represent the FFT equivalent of the image. Likewise, the image 708 includes an inset in the lower left corner illustrating the sinusoidal structured illumination pattern used to illuminate the target surface.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
projecting a structured illumination pattern onto a transparent target, the transparent target including surface features that modify the structured illumination pattern;
capturing, with an imaging device, an image of the modified structured illumination pattern at each of multiple different introduced phase shifts;
extracting, from the captured images, image components that correspond to frequencies exceeding a cutoff frequency of the imaging device; and
constructing a corrected image of the surface features of the transparent target based on the extracted image components, the corrected image having a resolution that is greater than a spatially incoherent point-to-point optical resolution of the imaging device.

2. The method of claim 1, further comprising: wherein projecting the structured illumination further comprises:
projecting light sequentially through a grayscale photomask and through a first side of the transparent target.

3. The method of claim 2, wherein the grayscale photomask has a sinusoidal pattern with a pitch equal to a cutoff frequency of the imaging device.

4. The method of claim 2, wherein the method further comprises:
capturing an image of the projected structured illumination at each of the multiple different positions of the grayscale photomask.

5. The method of claim 2, wherein the phase shifts are introduced by moving the photomask along a motorized stage.

6. The method of claim 1, wherein the structured illumination is projected onto a first side of the transparent target and the method further comprises:
imaging the structured illumination on a second opposite side of the transparent target.

7. The method of claim 1, wherein extracting the image components that correspond to frequencies in excess of the cutoff frequency of the imaging device further comprises:
converting each of the captured images to an associated frequency domain representation; and
extracting the image components from the frequency domain representations of the images.

8. The method of claim 1, further comprising:
shifting of each of the extracted image components in a frequency domain using a 2D Fourier domain interpolation shifting scheme.

9. The method of claim 8, wherein constructing the corrected image further comprises:
combining the shifted extracted image components to generate the corrected image.

10. A system comprising:
a light source positioned to project light onto a wavefront modulator to generate a structured illumination;
a transparent target positioned to receive the structured illumination, the transparent target including surface features that modify the structured illumination;
an imaging device positioned to capture an image of the modified structured illumination at each of multiple different introduced phase shifts;
an image processor configured to:
extract, from the captured images, image components that correspond to frequencies exceeding a cutoff frequency of the imaging device; and
creating a corrected image of the surface features of the transparent target based on the extracted image components, the corrected image having a resolution that is greater than a spatially incoherent point-to-point optical resolution of the imaging device.

11. The system of claim 10, wherein the image processor is further executable to:
convert each of the captured images to an associated frequency domain representation; and
extract the image components from the frequency domain representations of the images.

12. The system of claim 10, wherein the wavefront modulator is a grayscale photomask.

13. The system of claim 12, wherein the grayscale photomask has a sinusoidal pattern with a pitch equal to a cutoff frequency of the imaging device.

14. The system of claim 10, further comprising:
a motorized stage that moves the wavefront modulator across a range of positions.

15. The system of claim 10, wherein the imaging device includes a telecentric lens.

16. The system of claim 10, wherein each of the multiple different introduced phase shifts has a magnitude equal to the cutoff frequency of the imaging device.

17. A system comprising:
a grayscale photomask adapted to project a structured illumination;
a light source positioned to project light onto the grayscale photomask to generate a structured illumination;
a transparent target positioned to receive the structured illumination, the transparent target including surface features that modify the structured illumination;
an imaging device positioned to capture an image of the modified structured illumination pattern at each of multiple different phase shift of the structured illumination; and
an image processor configured to generate a corrected image of the surface features using the captured images, the corrected image having a resolution greater than a spatially incoherent point-to-point optical resolution of the imaging device.

18. The system of claim 17, wherein the grayscale photomask has a pattern pitch equal to a cutoff frequency of the imaging device.

19. The system of claim 17, further comprising:
a motorized stage that moves the grayscale photomask across a range of positions.

20. The system of claim 17, wherein the imaging device includes a telecentric lens.

* * * * *